(12) United States Patent
Nakata (10) Patent No.: US 11,356,467 B2
(45) Date of Patent: Jun. 7, 2022

(54) LOG ANALYSIS DEVICE, LOG ANALYSIS METHOD, AND LOG ANALYSIS PROGRAM

(71) Applicant: NIPPON TELEGRAPH AND TELEPHONE CORPORATION, Chiyoda-ku (JP)

(72) Inventor: Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 544 days.

(21) Appl. No.: 16/308,528

(22) PCT Filed: Jun. 7, 2017

(86) PCT No.: PCT/JP2017/021163
§ 371 (c)(1),
(2) Date: Dec. 10, 2018

(87) PCT Pub. No.: WO2017/217301
PCT Pub. Date: Dec. 21, 2017

(65) Prior Publication Data
US 2019/0149570 A1    May 16, 2019

(30) Foreign Application Priority Data

Jun. 13, 2016 (JP) .............. JP2016-116867

(51) Int. Cl.
*H04L 9/40* (2022.01)
*G06F 21/55* (2013.01)

(52) U.S. Cl.
CPC ........ *H04L 63/1425* (2013.01); *G06F 21/552* (2013.01); *H04L 63/145* (2013.01); *H04L 63/1416* (2013.01)

(58) Field of Classification Search
CPC ............ H04L 63/1425; H04L 63/1416; H04L 63/145; H04L 63/1441; G06F 21/552
See application file for complete search history.

(56) References Cited

U.S. PATENT DOCUMENTS 8,561,196 B1   10/2013  Viljoen et al.
8,613,089 B1 *  12/2013  Holloway ........... H04L 63/1458
                                                    726/23
(Continued)

FOREIGN PATENT DOCUMENTS

JP    2007-242002 A    9/2007
JP    2014-130614 A    7/2014
WO    WO 2016/076334 A1    5/2016

OTHER PUBLICATIONS

International Search Report dated Aug. 29, 2017 in PCT/JP2017/021163 filed Jun. 7, 2017.

(Continued)

*Primary Examiner* — Matthew Smithers
*Assistant Examiner* — Alexander R Lapian
(74) *Attorney, Agent, or Firm* — Oblon, McClelland, Maier & Neustadt, L.L.P.

(57) ABSTRACT

A log acquirer acquires an analysis communication log and a malicious communication log. A signature generator generates a signature serving as a condition for detecting a terminal infected with malware based on a field and a value included in the malicious communication log. A malware analysis report acquirer acquires information on the malware. A malware information adder adds the information on the malware to the signature. A log analyzer analyzes the analysis communication log using the signature and detects the terminal infected with the malware. A detection result display unit displays the detection result obtained from the analysis communication log by the log analyzer and the (Continued)

information on the malware added to the signature used in the analysis of the analysis communication log in a manner associated with each other.

8 Claims, 7 Drawing Sheets

(56) References Cited

U.S. PATENT DOCUMENTS

| | | | |
|---|---|---|---|
| 9,047,467 B1 | 6/2015 | Viljoen et al. | |
| 9,917,852 B1* | 3/2018 | Xu | H04L 63/0236 |
| 2009/0320133 A1 | 12/2009 | Viljoen et al. | |
| 2013/0167236 A1* | 6/2013 | Sick | G06F 21/56 |
| | | | 726/24 |
| 2015/0128274 A1* | 5/2015 | Giokas | H04L 63/1425 |
| | | | 726/23 |
| 2016/0285717 A1* | 9/2016 | Kim | H04W 12/128 |
| 2016/0323302 A1* | 11/2016 | Teixeira | H04L 63/0227 |
| 2016/0381042 A1* | 12/2016 | Zhang | H04L 63/1416 |
| | | | 726/24 |
| 2017/0070531 A1* | 3/2017 | Huston, III | H04L 63/1416 |
| 2017/0093902 A1* | 3/2017 | Roundy | H04L 63/1425 |
| 2017/0251003 A1* | 8/2017 | Rostami-Hesarsorkh | |
| | | | H04L 63/1425 |
| 2017/0339171 A1 | 11/2017 | Aoki et al. | |

OTHER PUBLICATIONS

Kamiya, K. et al. "Method of Detecting Malware Infected Terminal Using Firewall Logs," Information Processing Society of Japan Dai 77 Kai (Heisei 27 Nen) Zenkoku Taikai Koen Ronbunshu, 4E-03, Mar. 17, 2015, pp. 3-433-3-434, (with English translation).

Nakata, K. et al. "A Method of Extracting Common Malware Communication Patterns from Dynamic Analysis Result," Information Processing Society of Japan, Computer Security Symposium, 2015, pp. 318-325, (with English abstract).

* cited by examiner

| ITEM NUMBER | ITEM NAME | REMARKS |
|---|---|---|
| 1 | TIME STAMP | TIME WHEN COMMUNICATION LOG IS ACQUIRED |
| 2 | LogSource | ID UNIQUE TO DEVICE THAT RECORDS COMMUNICATION LOG |
| 3 | SOURCE IP ADDRESS | INFORMATION ON SOURCE IP ADDRESS OF COMMUNICATIONS |
| 4 | SOURCE PORT NUMBER | SOURCE PORT NUMBER OF COMMUNICATIONS |
| 5 | DESTINATION IP ADDRESS | DESTINATION IP ADDRESS OF COMMUNICATIONS |
| 6 | DESTINATION PORT NUMBER | DESTINATION PORT NUMBER OF COMMUNICATIONS |
| 7 | COMMUNICATION PROTOCOL NAME | COMMUNICATION PROTOCOL NAME OF COMMUNICATIONS |
| 8 | DETERMINATION RESULT | DETERMINATION RESULT IN DEVICE THAT PERFORMS COMMUNICATIONS |
| 9 | NUMBER OF TRANSMITTED BYTES | NUMBER OF TRANSMITTED BYTES IN COMMUNICATIONS |
| 10 | NUMBER OF RECEIVED BYTES | NUMBER OF RECEIVED BYTES IN COMMUNICATIONS |
| 11 | URL | DESTINATION URL OBTAINED WHEN COMMUNICATIONS ARE HTTP COMMUNICATIONS |
| 12 | METHOD NAME | HTTP METHOD NAME OBTAINED WHEN COMMUNICATIONS ARE HTTP COMMUNICATIONS |
| 13 | UserAgent | HTTP USER AGENT NAME OBTAINED WHEN COMMUNICATIONS ARE HTTP COMMUNICATIONS |
| 14 | STATUS CODE | HTTP STATUS CODE OBTAINED WHEN COMMUNICATIONS ARE HTTP COMMUNICATIONS |
| 15 | DURATION | SESSION DURATION IN COMMUNICATIONS |
| 16 | COMMUNICATION DIRECTION | COMMUNICATION DIRECTION IN COMMUNICATIONS |

FIG.3

| FIELD | VALUE | THRESHOLD | DETECTION CONDITION |
|---|---|---|---|
| URL | http://www.malsite.com/ | 1 | DETECT TERMINAL FOR WHICH COMMUNICATION LOG INCLUDING URL IS RECORDED ONE OR MORE TIMES |
| PROTOCOL+ DESTINATION PORT | TCP/4092 | 10 | DETECT TERMINAL FOR WHICH COMMUNICATION LOG INCLUDING VALUE IS RECORDED TEN OR MORE TIMES |
| DESTINATION ORGANIZATION | Malware.com | 1 | DETECT TERMINAL FOR WHICH COMMUNICATION LOG INCLUDING ORGANIZATION IS RECORDED ONE OR MORE TIMES |
| UserAgent | badAgent | 5 | DETECT TERMINAL FOR WHICH COMMUNICATION LOG INCLUDING UserAgent IS RECORDED FIVE OR MORE TIMES |
| DESTINATION IP ADDRESS | 10.10.10.10 | 5 | DETECT TERMINAL FOR WHICH COMMUNICATION LOG INCLUDING DESTINATION IP ADDRESS IS RECORDED FIVE OR MORE TIMES |

FIG.4

| ITEM NUMBER | ITEM NAME | REMARKS |
|---|---|---|
| 1 | imphash | HASH VALUE OF IMPORT FUNCTION OF MALWARE |
| 2 | TrID | FILE TYPE OF MALWARE |
| 3 | First_Seen | DATE AND TIME WHEN MALWARE IS REGISTERED IN SHARING SITE FOR FIRST TIME |
| 4 | DETECTION NAME OF AntiVirus VENDOR | DETECTION RESULT OF AV SOFTWARE ON MALWARE |
| 5 | behaviour | OPERATION INFORMATION ON MALWARE |
| 6 | Sha1 | Sha1 HASH VALUE OF MALWARE |

FIG.5

| FIELD | VALUE | THRESH-OLD | MALWARE INFORMATION |
|---|---|---|---|
| URL | http://www.malsite.com/ | 1 | Win-PUP/SoftPulse |
| PROTOCOL+ DESTINATION PORT | TCP/4092 | 10 | BehavesLike.Win32.CryptDoma.dc |
| DESTINATION ORGANIZATION | Malware.com | 1 | Gen:Variant.Application.Bundler.SoftPulse.4 |
| UserAgent | badAgent | 5 | Trojan.Win32.DriverUpd.dmhxcl |
| DESTINATION IP ADDRESS | 10.10.10.10 | 5 | Trj/Genetic.gen,Signed-Adware.Softpulse |

LOG ANALYSIS DEVICE, LOG ANALYSIS METHOD, AND LOG ANALYSIS PROGRAM

FIELD

The present invention relates to a log analysis device, a log analysis method, and a log analysis program.

BACKGROUND

Cyberattacks on various services and infrastructures via networks are now becoming more persistent using a great variety of methods, and their threat is increasing. It is, however, difficult to prevent infection completely. To address this, widely known are malware-infected terminal detection techniques for finding and disinfecting a malware-infected terminal at an early stage based on information on communications on the assumption that infection occurs.

Various malware-infected terminal detection techniques are known, including a technique of creating signatures based on a malicious list and behavior of communications using the results of a dynamic analysis of malware and analyzing a communication log to be protected, for example.

CITATION LIST

Non Patent Literature

Non Patent Literature 1: Kensuke Nakata, Kazufumi Aoki, Kazunori Kamiya, Susumu Kakuta, and Yoshihito Oshima, "A Method of Extracting Common Malware Communication Patterns from Dynamic Analysis Result," Information Processing Society of Japan, Computer Security Symposium 2015

SUMMARY

Technical Problem

The conventional technique, however, has a problem in that it is difficult for an operator to determine whether to perform a detailed analysis and take an action based on a detection result of a log analysis. The conventional technique, for example, may notify the operator of a detection result of a log analysis and a signature used in the detection. In this case, the operator can obtain information on the detection result and the signature but fails to obtain information used to determine what kind of action the operator should take to the detection result. This mechanism makes it difficult for the operator to analyze the detection result and determine whether to perform a detailed analysis and take an action.

Solution to Problem

To solve a problem and to achieve an object, a log analysis device comprises: a log acquirer configured to acquire a first communication log obtained from communications in a predetermined network and a second communication log obtained from communications performed by malware; a signature generator configured to generate a signature serving as a condition for detecting a terminal infected with the malware based on a field and a value included in the second communication log; a malware information acquirer configured to acquire information on the malware; a malware information adder configured to add the information on the malware to the signature; a detector configured to analyze the first communication log using the signature and detect the terminal infected with the malware; and a display unit configured to display a detection result obtained from the first communication log by the detector and the information on the malware added to the signature used in the analysis of the first communication log in a manner associated with each other.

To solve a problem and to achieve an object, a log analysis method performed by a log analysis device, the log analysis method comprises: a step of acquiring a first communication log obtained from communications in a predetermined network and a second communication log obtained from communications performed by malware; a step of generating a signature serving as a condition for detecting a terminal infected with the malware based on a field and a value included in the second communication log; a step of acquiring information on the malware; a step of adding the information on the malware to the signature; a step of detecting the terminal infected with the malware by analyzing the first communication log using the signature; and a step of displaying a detection result obtained from the first communication log by the step of detecting and the information on the malware added to the signature used in the analysis of the first communication log in a manner associated with each other.

Advantageous Effects of Invention

The present invention enables an operator to readily determine whether to perform a detailed analysis and take an action based on a detection result of a log analysis.

DESCRIPTION OF EMBODIMENTS

Exemplary embodiments of a log analysis device, a log analysis method, and a log analysis program according to the present application are described below in greater detail with reference to the accompanying drawings. The embodiments are not intended to limit the present invention.

Configuration of the First Embodiment

Figure 1:
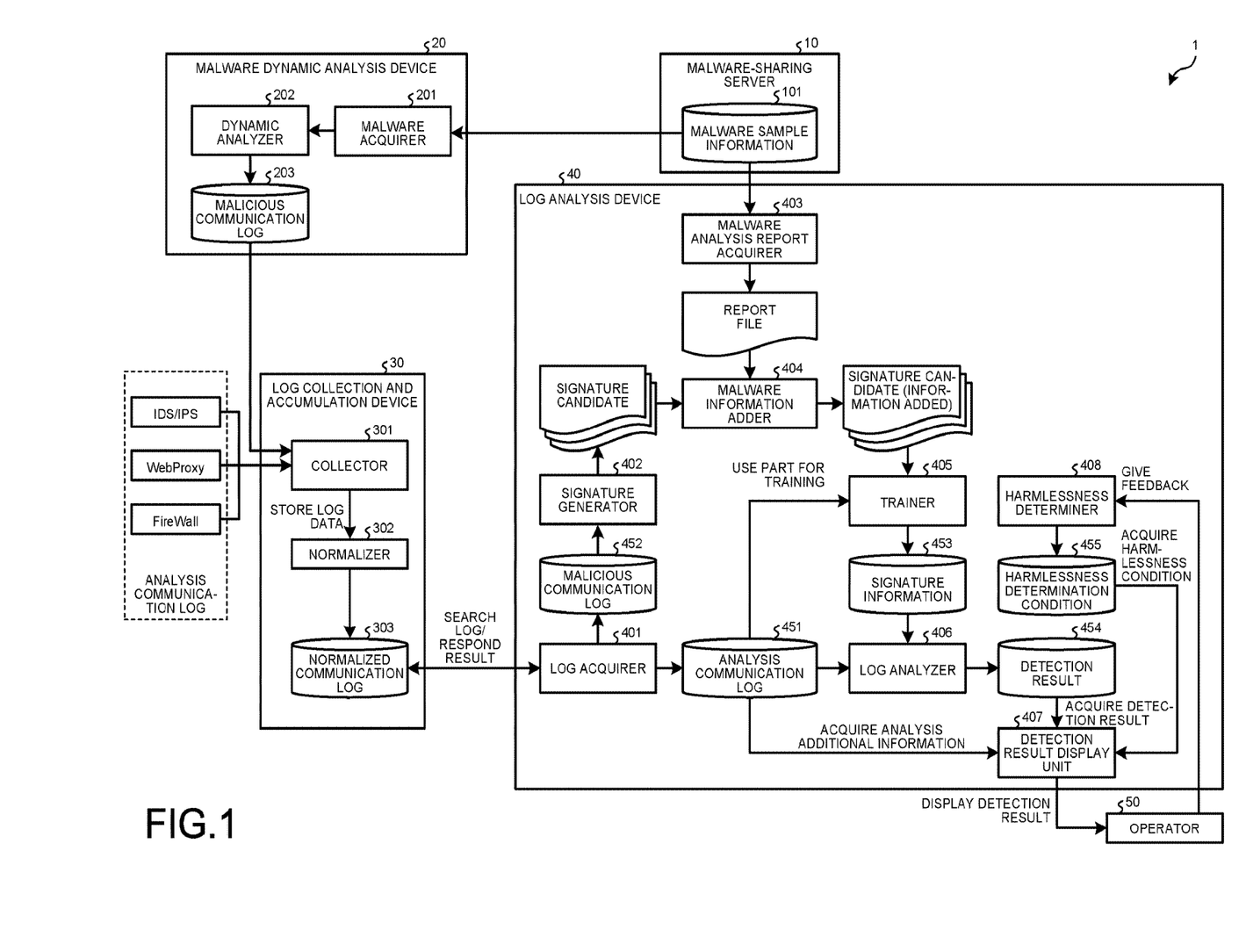
FIG. 1 is a diagram of an example of the configuration of a log analysis system according to a first embodiment.

The configuration of a log analysis system according to a first embodiment is described with reference to FIG. T. FIG. 1 is a diagram of an example of the configuration of the log analysis system according to the first embodiment. As illustrated in FIG. 1, a log analysis system 1 includes a malware-sharing server 10, a malware dynamic analysis device 20, a log collection and accumulation device 30, and a log analysis device 40.

The malware-sharing server 10, the malware dynamic analysis device 20, the log collection and accumulation device 30, and the log analysis device 40 are coupled via any desired kind of communication network, such as a wired or wireless LAN (local area network) and VPN (virtual private network). The number of log analysis devices 40 included in the log analysis system 1 is not limited to the number illustrated in the drawing and may be any desired number.

The malware-sharing server 10, the malware dynamic analysis device 20, the log collection and accumulation device 30, and the log analysis device 40 each include a communication unit, a controller, and a storage unit, which are not illustrated.

The communication unit performs data communications with other devices via a network. The communication unit is an NIC (network interface card), for example. The controller controls the whole device. The controller is an electronic circuit, such as a CPU (central processing unit) and an MPU (micro processing unit), or an integrated circuit, such as an ASIC (application specific integrated circuit) and an FPGA (field programmable gate array). The controller includes an internal memory that stores therein programs defining various processing procedures and control data. The controller performs the processing using the internal memory. The controller executing the various programs, thereby providing the processing units.

The storage unit is a storage device, such as an HDD (hard disk drive), an SSD (solid state drive), and an optical disc. The storage unit may be a data-rewritable semiconductor memory, such as a RAM (random access memory), a flash memory, and an NVSRAM (non-volatile static random access memory). The storage unit stores therein an OS (operating system) and various programs executed by the device. The storage unit also stores therein various kinds of information used in execution of the programs.

The controller executes the programs, for example, thereby providing a log acquirer 401, a signature generator 402, a malware analysis report acquirer 403, a malware information adder 404, a trainer 405, a log analyzer 406, a detection result display unit 407, and a harmlessness determiner 408, which will be described later. The storage unit, for example, stores therein an analysis communication log 451, a malicious communication log 452, signature information 453, a detection result 454, and a harmlessness determination condition 455, which will be described later.

The following describes the devices in the log analysis system 1. The malware-sharing server 10 provides information on malware to the log analysis device 40 and other devices via a malware-sharing site. Examples of the malware-sharing site include, but are not limited to, VirusTotal, etc. As illustrated in FIG. 1, the malware-sharing server 10 stores therein the information on malware as malware sample information 101.

The malware dynamic analysis device 20 causes malware to operate and acquires a malicious communication log. As illustrated in FIG. 1, the malware dynamic analysis device 20 includes a malware acquirer 201 and a dynamic analyzer 202 and stores therein a malicious communication log 203. The malware acquirer 201 acquires the malware sample information 101 from the malware-sharing server 10. The dynamic analyzer 202 causes malware infecting a terminal to operate and acquires the malicious communication log 203. The malware acquirer 201 may be provided with a honeypot to acquire malware.

The log collection and accumulation device 30 collects and accumulates communication logs to be analyzed and malicious communication logs. As illustrated in FIG. 1, the log collection and accumulation device 30 includes a collector 301 and a normalizer 302 and stores therein a normalized communication log 303. The collector 301 acquires the malicious communication log 203 from the malware dynamic analysis device 20.

The collector 301 acquires a communication log to be analyzed from IDS (intrusion detection system)/IPS (intrusion prevention system), WebProxy, FireWall, or the like. The communication log to be analyzed is yet to be determined whether it is malicious.

The normalizer 302 normalizes a communication log. A communication log may possibly have different formats depending on devices that record the communication log. The normalizer 302 extracts predetermined fields and values from a communication log, thereby normalizing the communication log. The communication logs normalized by the normalizer 302 include communication logs to be analyzed and malicious communication logs, for example. The log collection and accumulation device 30 stores therein the normalized communication log as the normalized communication log 303.

Figure 2:
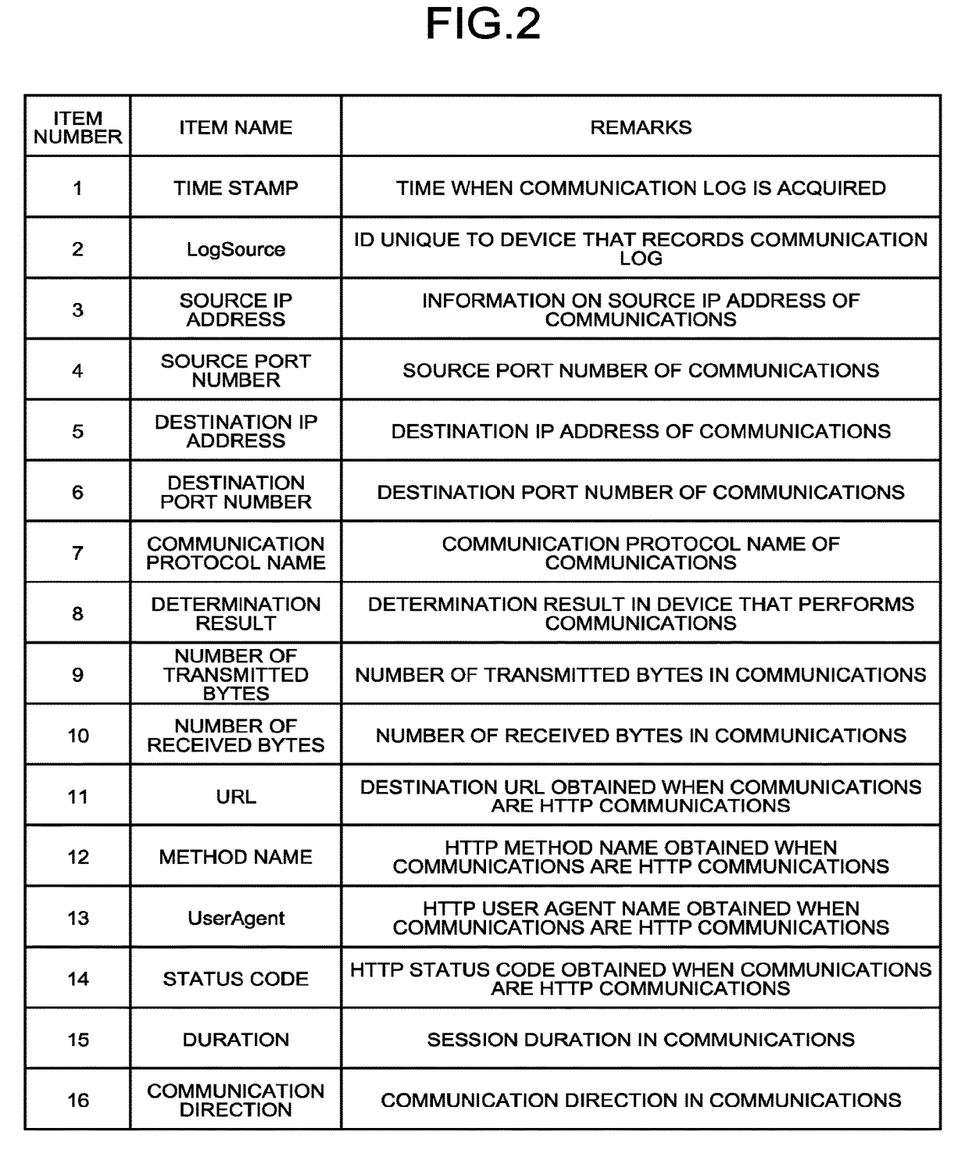
FIG. 2 is a diagram of an example of fields of a communication log.

The following describes the fields and the values of a communication log with reference to FIG. 2. FIG. 2 is a diagram of an example of the fields of a communication log. The normalizer 302, for example, extracts the fields and the values illustrated in FIG. 2 from a communication log as the normalized communication log 303.

As illustrated in FIG. 2, the fields of a communication log include a time stamp, LogSource, a source IP address, a source port number, a destination IP address, a destination port number, a communication protocol name, a determination result, the number of transmitted bytes, the number of received bytes, a URL, a method name, UserAgent, a status code, duration, and a communication direction, for example.

The value of the field "time stamp" indicates time when a communication log is acquired. The value of the field "LogSource" indicates an ID unique to a device that records the communication log. The value of the field "source IP address" indicates information on a source IP address of the communications. The value of the field "source port number" indicates a source port number of the communications. The value of the field "destination IP address" indicates a destination IP address of the communications. The value of the field "destination port number" indicates a destination port number of the communications. The value of the field "communication protocol name" indicates a communication protocol name of the communications. The value of the field "determination result" indicates a determination result in the device that performs the communications. The value of the field "number of transmitted bytes" indicates the number of transmitted bytes in the communications. The value of the field "number of received bytes" indicates the number of received bytes in the communications. The value of the field "URL" indicates a destination URL obtained when the communications are HTTP communications. The value of the field "method name" indicates an HTTP method name obtained when the communications are HTTP communications. The value of the field "UserAgent" indicates an HTTP user agent name obtained when the communications are HTTP communications. The value of the field "status code" indicates an HTTP status code obtained when the communications are HTTP communications. The value of the field "duration" indicates session duration in the communications. The value of the field "communication direction" indicates a communication direction in the communications.

The log analysis device 40 analyzes a communication log and displays an analysis result and information on malware serving as a generation source of a signature used in the analysis. As illustrated in FIG. 1, the log analysis device 40 includes the log acquirer 401, the signature generator 402, the malware analysis report acquirer 403, the malware information adder 404, the trainer 405, the log analyzer 406, the detection result display unit 407, and the harmlessness determiner 408. The log analysis device 40 stores therein the analysis communication log 451, the malicious communication log 452, the signature information 453, the detection result 454, and the harmlessness determination condition 455.

The log acquirer 401 acquires the normalized communication log 303 from the log collection and accumulation device 30. The log acquirer 401, for example, searches for the normalized communication log 303 with predetermined search conditions to make an inquiry about acquisition of logs. The log collection and accumulation device 30 transmits a search result to the log acquirer 401 as a response. The normalized communication log 303 acquired by the log acquirer 401 includes both of communication logs to be analyzed and malicious communication logs. In the following description, the normalized communication log is simply referred to as a communication log.

The log acquirer 401 stores the communication logs to be analyzed out of the acquired communication logs in the log analysis device 40 as the analysis communication log 451. The log acquirer 401 also stores the malicious communication logs out of the acquired communication logs in the log analysis device 40 as the malicious communication log 452. As described above, the log acquirer 401 acquires the analysis communication log 451 obtained from communications in a predetermined network and the malicious communication log 452 obtained from communications performed by malware.

Figure 3:
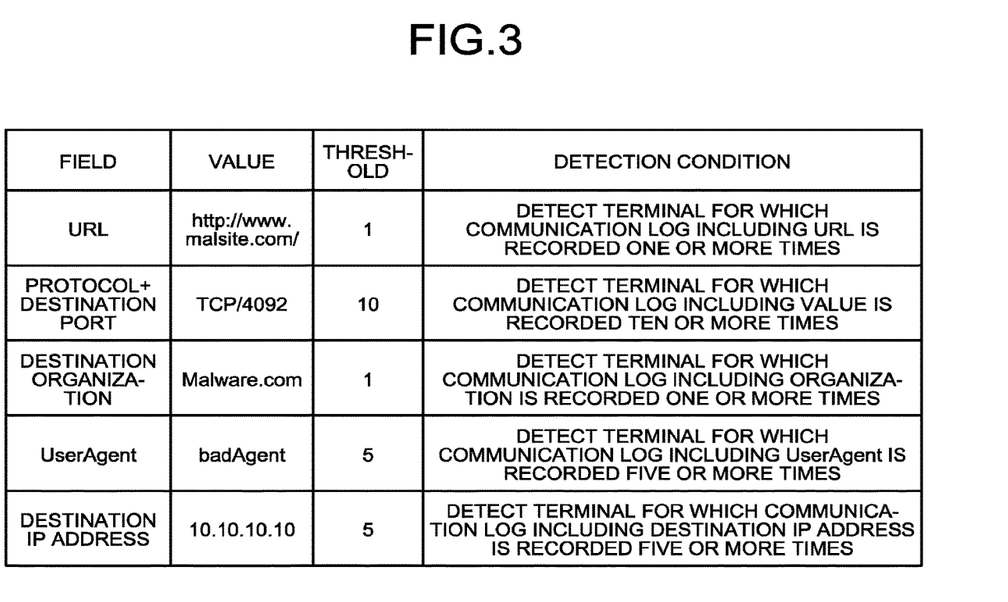
FIG. 3 is a diagram of an example of signature candidates.

The signature generator 402 generates a signature serving as a condition for detecting a terminal infected with malware based on a field and a value included in the malicious communication log 452. The following describes a signature candidate with reference to FIG. 3. FIG. 3 is a diagram of an example of signature candidates.

The signature generator 402 extracts a field satisfying a predetermined condition from the fields included in the malicious communication log 452 and generates a signature in which a threshold is set corresponding to a pair of the extracted field and the value. If the number of times, the ratio, or the order of occurrence of a field and a value in the malicious communication log 452 satisfies the predetermined condition, for example, the signature generator 402 extracts the field and the value as a signature candidate.

As illustrated in FIG. 3, for example, the signature generator 402 generates a signature having a field of "URL", a value of "http://www.malsite.com/", and a threshold of 1. In this case, for example, the log analysis device 40 detects a terminal for which a communication log including the URL is recorded one or more times.

The signature generator 402, for example, generates a signature having a field of "protocol+destination port", a value of "TCP/4092", and a threshold of 10. In this case, for example, the log analysis device 40 detects a terminal for which a communication log including the value is recorded ten or more times. As described above, the signature generator 402 may generate a signature candidate by combining the values of fields.

The signature generator 402, for example, generates a signature having a field of "destination organization", a value of "Malware.com", and a threshold of 1. In this case, for example, the log analysis device 40 detects a terminal for which a communication log including the organization is recorded one or more times. The destination organization can be extracted from the URL information in the communication log.

The signature generator 402, for example, generates a signature having a field of "UserAgent", a value of "badAgent", and a threshold of 5. In this case, for example, the log analysis device 40 detects a terminal for which a communication log including the UserAgent is recorded five or more times.

The signature generator 402, for example, generates a signature having a field of "destination IP address", a value of "10.10.10.10", and a threshold of 5. In this case, for example, the log analysis device 40 detects a terminal for which a communication log including the destination IP address is recorded five or more times.

Figure 4:
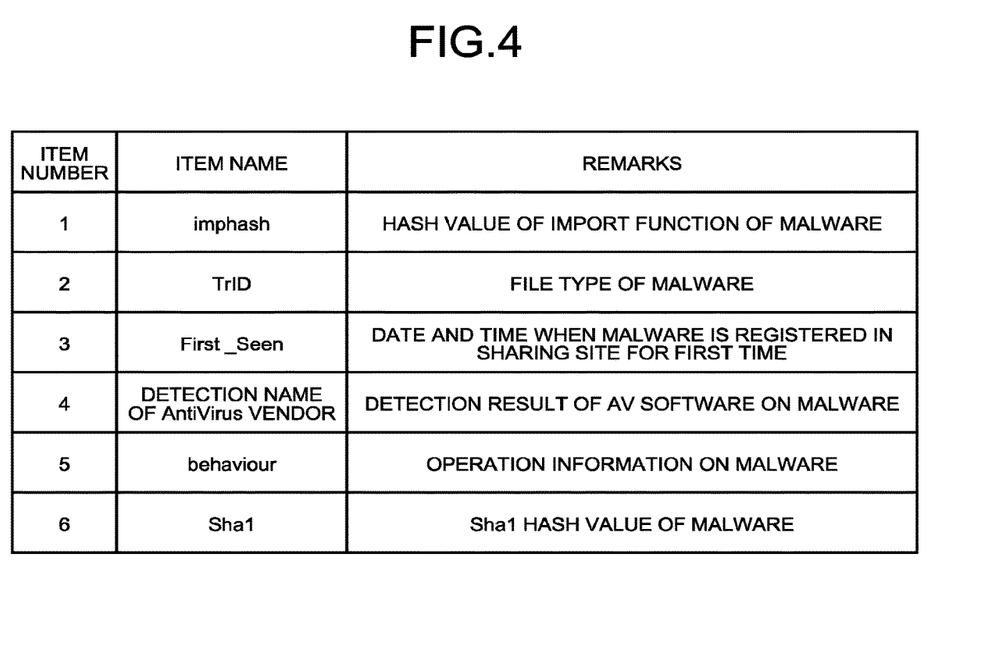
FIG. 4 is a diagram of an example of information on malware.

The malware analysis report acquirer 403 acquires information on malware. The malware analysis report acquirer 403 acquires the malware sample information 101 from the malware-sharing server 10 via the malware-sharing site. The malware analysis report acquirer 403 transfers the acquired malware sample information 101 to the malware information adder 404 as a report file. As illustrated in FIG. 4, the report file transferred from the malware sample information 101 includes, as the information on malware, information on a file accessed by malware, a command executed by the malware, behavior of the malware in an infected terminal, and a detection result of (anti-virus) software on the malware, for example. FIG. 4 is a diagram of an example of the information on malware.

As illustrated in FIG. 4, the items in the information on malware include "imphash", "TrID", "First_Seen", "detection name of AntiVirus vendor", "behaviour", and "Sha1", for example.

The item "imphash" indicates a hash value of an import function of the malware. The item "TrID" indicates a file type of the malware. The item "First_Seen" indicates the date and time when the malware is registered in the sharing site for the first time. The item "detection name of AntiVirus vendor" indicates a detection result of AV software on the malware. The item "behaviour" indicates operation information on the malware. The item "Sha1" indicates the Sha1 hash value of the malware. If there is a web page that collectively describes pieces of information on the malware, the log analysis device 40 may store the URL of the web page in the report file or the like as a reference URL and display it on the detection result display unit 407.

The malware information adder 404 adds the information on malware to a signature candidate. The malware information adder 404 adds the information on malware included in the report file to the signature candidates. The malware information adder 404, for example, adds at least one of the file type, the date and time of registration, the detection name, and the operation information to the signature candidates. The signature candidates each have the malicious communication log 452 serving as a generation source. The malware information adder 404 adds the information corresponding to the malware from which the malicious communication log 452 is generated. The information for identifying malware operated by the dynamic analyzer 202 to acquire the malicious communication log 203, for example, is distributed to the log collection and accumulation device 30 and the log analysis device 40 together with the malicious communication log 203. As a result, the malware information adder 404 can associate the signature candidate with the information on malware.

One signature candidate may possibly have a plurality of pieces of malware serving as generation sources. In such a case, the malware information adder 404 may add, to one signature candidate, the information on a plurality of pieces of malware in parallel or only the information on one piece of malware specified by a predetermined condition.

The malware information adder 404, for example, may add a classification name of malware provided by a vendor having the highest degree of reliability out of the vendors serving as providers of the information on malware. Alternatively, the malware information adder 404 may add a classification name provided from the largest number of vendors.

Figure 5:
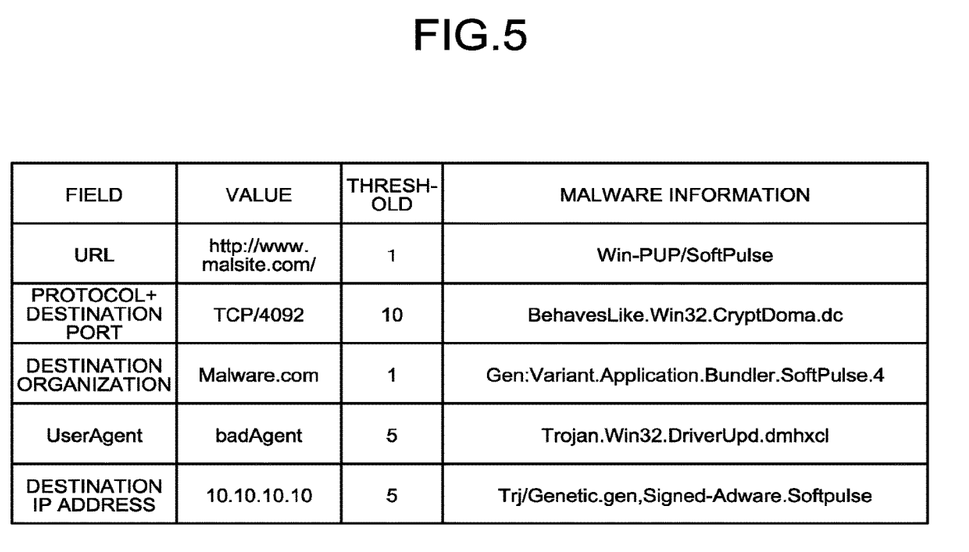
FIG. 5 is a diagram of an example of the signature candidates to which the information on malware is added.

The following describes the signature candidates to which the information on malware is added with reference to FIG. 5. FIG. 5 is a diagram of an example of the signature candidates to which the information on malware is added. In the example illustrated in FIG. 5, the classification name of malware, that is, the value of the item "detection name of AntiVirus vendor" illustrated in FIG. 4 is added to the signature candidates as an example of the information on malware.

As illustrated in FIG. 5, the malware information adder 404, for example, adds malware information "Win-PUP/SoftPulse" to the signature candidate having the field of "URL", the value of "http://www.malsite.com/", and a threshold of 1.

The malware information adder 404, for example, adds malware information "BehavesLike.Win32.CryptDoma.dc" to the signature candidate having the field of "protocol+ destination port", the value of "TCP/4092", and a threshold of 10.

The malware information adder 404, for example, adds malware information "Gen:Variant.Application.Bundler-.SoftPulse.4" to the signature candidate having the field of "destination organization", the value of "Malware.com", and a threshold of 1.

The malware information adder 404, for example, adds malware information "Trojan.Win32.DriverUpd.dmhxcl" to the signature candidate having the field of "UserAgent", the value of "badAgent", and a threshold of 5.

The malware information adder 404, for example, adds malware information "Trj/Genetic.gen,Signed-Adware.Softpulse" to the signature candidate having the field of "destination IP address", the value of "10.10.10.10", and a threshold of 5.

The trainer 405 performs training on the signature candidates using a learning communication log. The trainer 405 uses the analysis communication log 451 accumulated for a predetermined period of time as the learning communication log, for example. The trainer 405, for example, considers all the results detected using the signature candidates as erroneous detection and excludes a signature candidate having the result of erroneous detection satisfying a predetermined condition. The trainer 405, for example, excludes a signature candidate having the number or the ratio of erroneous detection equal to or larger than a predetermined threshold. The trainer 405 stores the remaining signature candidates in the signature information 453. As described above, the trainer 405 excludes a signature having the number or the ratio of erroneous detection in the analysis of the analysis communication log 451 equal to or larger than the predetermined value from the signature candidates.

The signature information 453 stores therein the information on malware added by the malware information adder 404 in a manner associated with the signature. The log analysis device 40 does not necessarily perform training by the trainer 405 and may store all the signature candidates in the signature information 453.

The log analyzer 406 analyzes the analysis communication log 451 using the signature and detects a terminal infected with malware. The log analyzer 406 detects a terminal satisfying the detection conditions of the respective signatures as illustrated in FIG. 3. The log analyzer 406 transmits the detection result 454 to the detection result display unit 407. The detection result 454 includes the signature used in detection, the information on the detected terminal, and the information on malware added to the signature. The log analyzer 406 may store, as the information on the terminal, the source IP included in the analysis communication log 451 or the user ID or the ID information on the terminal acquired based on the information on the source IP from another available DB.

Figure 6:
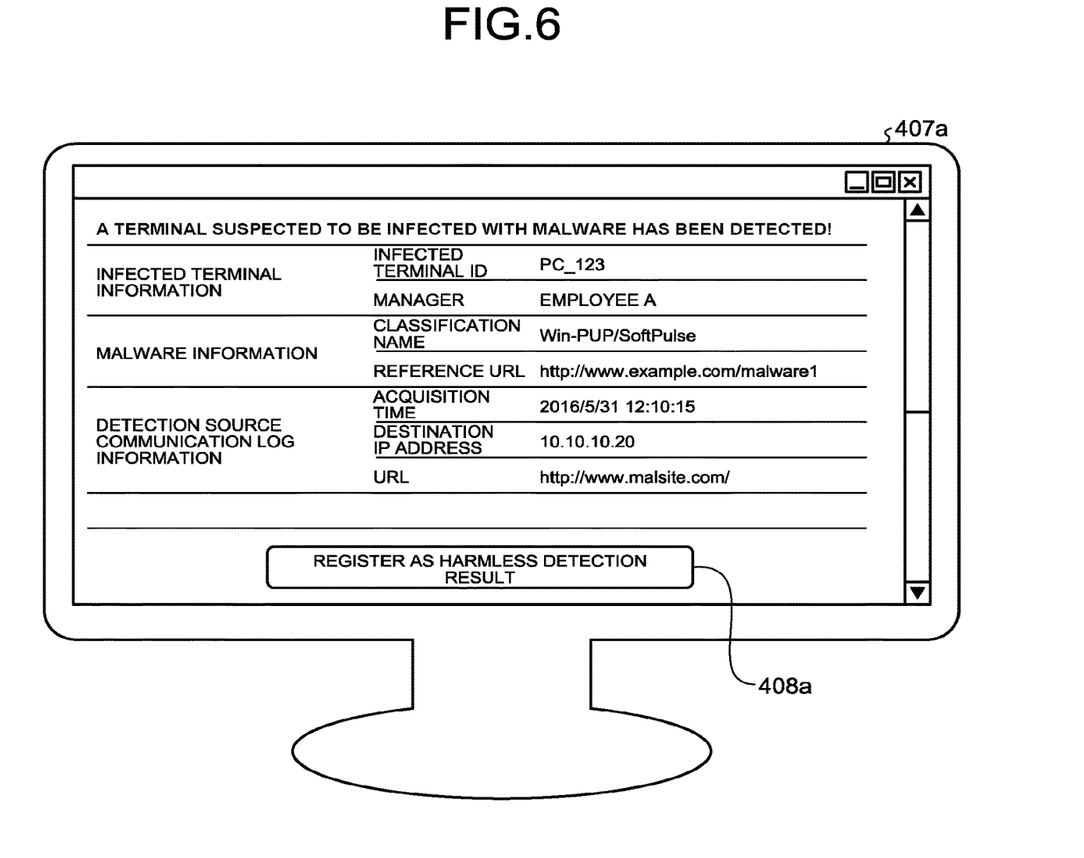
FIG. 6 is a diagram of an example of a detection result display screen.

The detection result display unit 407 displays the detection result 454. As illustrated in FIG. 6, for example, the detection result display unit 407 displays the detection result 454 on a detection result display screen 407a in a form browsable by an operator 50. FIG. 6 is a diagram of an example of the detection result display screen. The detection result display unit 407 displays the detection result obtained from the analysis communication log 451 by the log analyzer 406 and the information on malware added to the signature used in the analysis of the analysis communication log 451 in a manner associated with each other. The detection result display unit 407 may acquire information not included in the detection result 454 as analysis additional information from the analysis communication log 451 and display it as the information on the communication log.

In the example illustrated in FIG. 6, the detection result display unit 407 displays infected terminal information indicating that the terminal ID of the infected terminal is "PC 123" and that the manager is "employee A". The detection result display unit 407 may display the user ID or the ID information on the terminal acquired by the log analyzer 406 as the infected terminal information.

The detection result display unit 407 displays that the classification name of the malware assigned to the malware serving as the cause of the detection result is "Win-PUP/SoftPulse" and that the reference URL is "http://www.example.com/malware1". The reference URL is an URL of a malware-sharing site that provides the information on the malware, for example.

The detection result display unit 407 also displays information on the analysis communication log 451 having the field and the value agreeing with those of the signature out of the analysis communication logs 451. The detection result display unit 407 displays that the acquisition time is "2016/5/31 12:10:15", that the destination IP address is "10.10.10.20", and that the URL is "http://www.malsite-.com/" as the information on the communication log serving as the cause of detection of the malware-infected terminal.

The detection result display unit 407 also displays a harmlessness determination button 408a. If the operator 50 presses the harmlessness determination button 408a, the harmlessness determiner 408 generates the harmlessness determination condition 455 as a condition for determining that the detection result of the log analysis is harmless. If the detection result of a log analysis satisfies the harmlessness determination condition 455, the detection result display unit 407 does not display the detection result of the log analysis or the information on malware added to the signature used in the analysis.

As described above, the harmlessness determiner 408 receives selection indicating whether the detection result is harmless and generates a condition based on the selection. The detection result display unit 407 determines whether the detection result is harmless based on whether the detection result satisfies the condition generated by the harmlessness determiner 408. If the detection result display unit 407 determines that the detection result is not harmless, it displays the detection result and the information on the malware added to the signature used in the analysis in a manner associated with each other.

The timing when the information on malware is added to the signature is not limited to that in the example illustrated in FIG. 1. The malware information adder 404, for example, may add the information on malware to the signature after the training performed by the trainer 405 and the log analysis performed by the log analyzer 406.

Processing According to the First Embodiment

Figure 7:
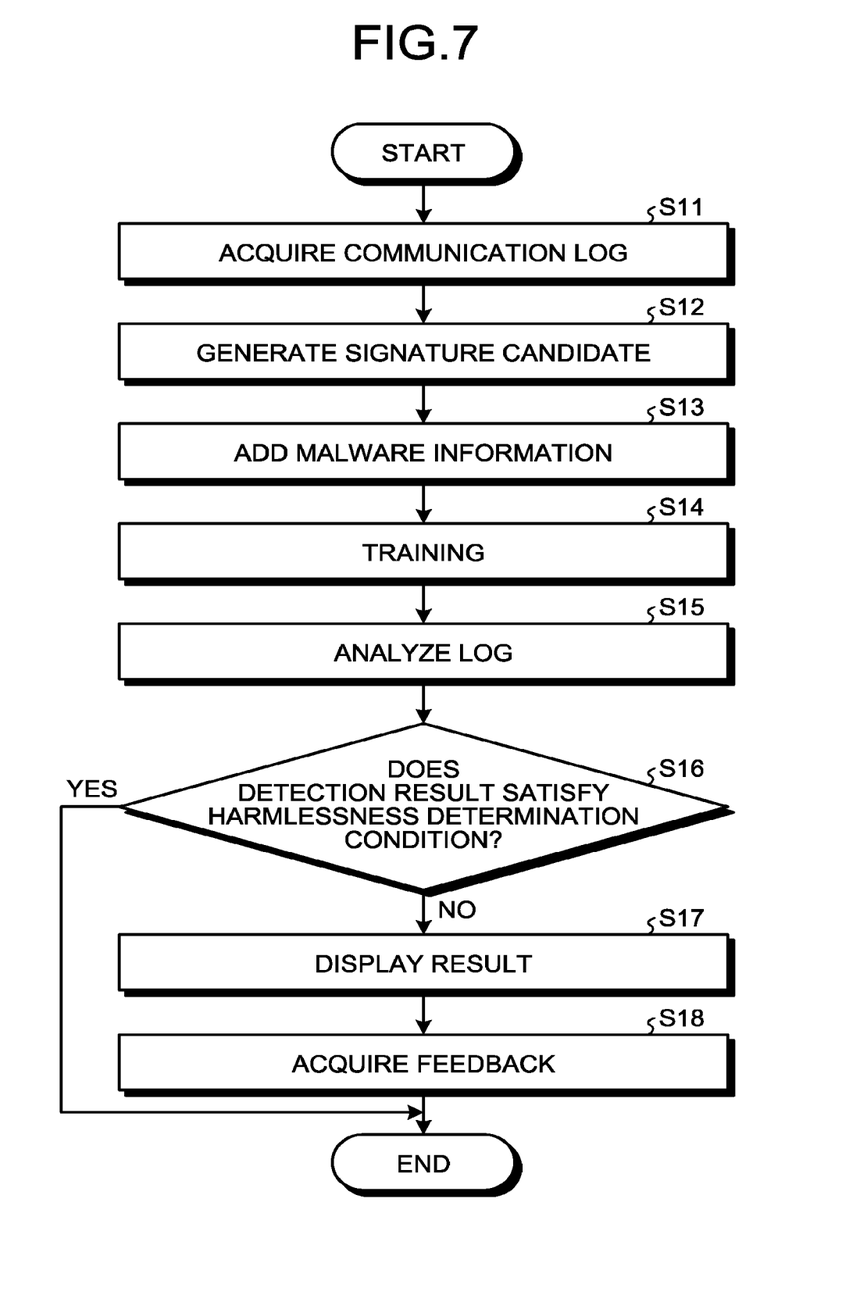
FIG. 7 is a flowchart of a processing procedure performed by a log analysis device according to the first embodiment.

The following describes a processing procedure performed by the log analysis device 40 with reference to FIG. 7. FIG. 7 is a flowchart of a processing procedure performed by the log analysis device according to the first embodiment. As illustrated in FIG. 7, the log acquirer 401 acquires communication logs first (Step S11). The communication logs acquired by the log acquirer 401 include the analysis communication log 451 and the malicious communication log 452.

Subsequently, the signature generator 402 generates a signature candidate based on the malicious communication log 452 (Step S12). The malware information adder 404 adds the information on malware to the signature candidate (Step S13). The malware information adder 404 adds, to the signature candidate, the information on malware that generates the malicious communication log 452 serving as a generation source of the signature candidate, for example.

Subsequently, the trainer 405 performs training on the signature candidate using the learning communication log (Step S14). The trainer 405, for example, excludes a signature candidate having the ratio of erroneous detection equal to or larger than a predetermined value from the signature candidates.

Subsequently, the log analyzer 406 analyzes the analysis communication log 451 using the signature (Step S15). The log analyzer 406 detects a terminal satisfying the detection condition for the signature as a terminal infected with malware.

If the detection result obtained by the log analyzer 406 satisfies the harmlessness determination condition (Yes at Step S16), the detection result display unit 407 does not display the detection result. By contrast, if the detection result obtained by the log analyzer 406 does not satisfy the harmlessness determination condition 455 (No at Step S16), the detection result display unit 407 displays the detection result (Step S17). If the displayed detection result is determined to be harmless by the operator 50, the harmlessness determiner 408 gives feedback of the determination to the harmlessness determination condition 455 (Step S18).

Advantageous Effects of the First Embodiment

The log acquirer 401 acquires the analysis communication log 451 obtained from communications in a predetermined network and the malicious communication log 452 obtained from communications performed by malware. The signature generator 402 generates a signature serving as a condition for detecting a terminal infected with the malware based on the field and the value included in the malicious communication log 452. The malware analysis report acquirer 403 acquires information on the malware. The malware information adder 404 adds the information on the malware to the signature. The log analyzer 406 analyzes the analysis communication log 451 using the signature and detects the terminal infected with the malware. The detection result display unit 407 displays the detection result obtained from the analysis communication log 451 by the log analyzer 406 and the information on the malware added to the signature used in the analysis of the analysis communication log 451 in a manner associated with each other.

Consequently, the operator can find out that a terminal is infected with malware and obtain the information on malware associated with the detection result. As a result, the operator can readily perform an analysis or the like based on the information on malware associated with the detection result.

The detection result display unit 407 also displays the information on the analysis communication log 451 having the field and the value agreeing with those of the signature out of the analysis communication logs 451. As described above, not only the detection result but also the information on the communication log serving as the cause of detection are displayed. Consequently, the operator can obtain more information and more readily perform an analysis.

The harmlessness determiner 408 receives selection indicating whether the detection result is harmless and generates a condition based on the selection. The detection result display unit 407 determines whether the detection result is harmless based on whether the detection result satisfies the condition generated by the harmlessness determiner 408. If the detection result display unit 407 determines that the detection result is not harmless, it displays the detection result and the information on malware added to the signature used in the analysis in a manner associated with each other.

As described above, the log analysis reflects the determination made by the operator. Consequently, the operator need not perform an analysis on the detection result determined to be harmless once and can perform the analysis more efficiently.

The signature generator 402 extracts a field satisfying a predetermined condition from the fields included in the malicious communication log 452 and generates a signature in which a threshold is set corresponding to a pair of the extracted field and the value. Consequently, the field having a smaller effect on the detection accuracy is excluded, thereby reducing the processing load in the log analysis.

The trainer 405 excludes a signature having the number or the ratio of erroneous detection in the analysis of the analysis communication log 451 equal to or larger than a predetermined threshold from the signatures. Consequently, the ratio of erroneous detection in the log analysis is reduced.

The malware information adder 404 adds at least one of the file type, the date and time of registration, the detection name, and the operation information to the signature. As described above, the information capable of being viewed and understood by the operator is added, thereby facilitating the analysis.

System Configuration and the Like

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processing described as automatically performed processing out of the processing described in the present embodiment may be performed manually. Alternatively, all or part of the processing described as manually performed processing may be performed automatically by a known method. In addition, the processing procedures, the control procedures, the specific names, and the information including various kinds of data and parameters described in the present specification and the drawings can be optionally changed unless there is any special mention.

Programs

The log analysis device 40 according to an embodiment can be provided by installing, in a desired computer, a log analysis program that performs the log analysis described above as packaged or online software. An information processing device executes the log analysis program, for example, thereby serving as the log analysis device 40. Examples of the information processing device may include, but are not limited to, desktop or notebook personal computers, etc. Examples of the information processing device may also include, but are not limited to, mobile communication terminals, such as smartphones, mobile phones, and PHS (personal handy-phone system), slate terminals, such as PDA (personal digital assistants), etc.

A terminal device used by a user may be defined as a client, and the log analysis device 40 may be provided as a log analysis server device that provides services relating to the log analysis to the client. The log analysis server device, for example, is provided as a server device that provides log analysis services of receiving the communication log of the user and outputting the analysis result and the information on malware added to the signature used in the analysis. In this case, the log analysis server device may be provided as a web server or a cloud that provides services relating to the log analysis by outsourcing.

Figure 8:
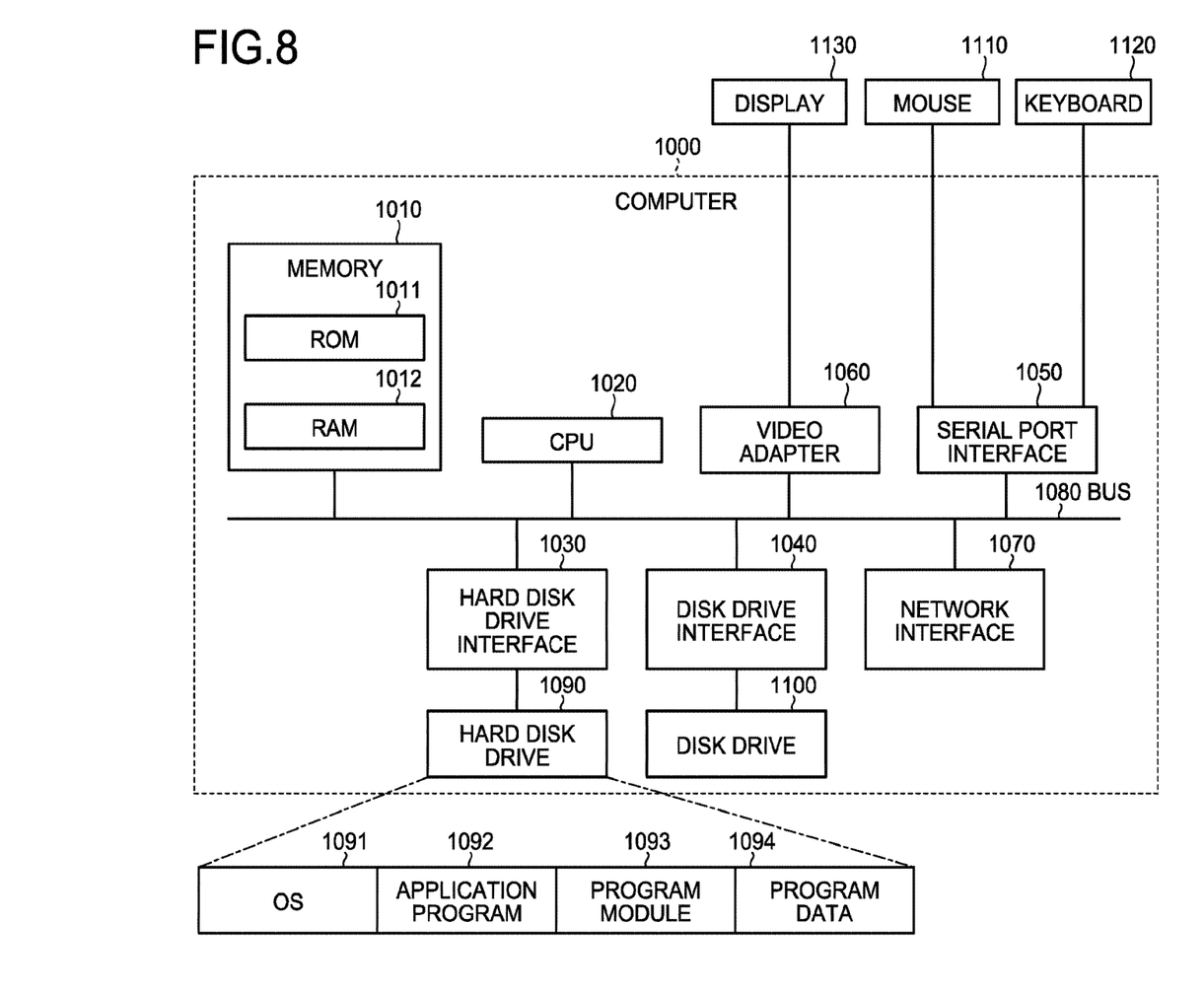
FIG. 8 is a diagram of an example of a computer serving as the log analysis device by executing a program.

FIG. 8 is a diagram of an example of a computer serving as the log analysis device by executing the program. A computer 1000 includes a memory 1010 and a CPU 1020. The computer 1000 also includes a hard disk drive interface 1030, a disk drive interface 1040, a serial port interface 1050, a video adapter 1060, and a network interface 1070, for example. These components are coupled via a bus 1080.

The memory 1010 includes a ROM (read only memory) 1011 and a RAM 1012. The ROM 1011 stores therein a boot program, such as a BIOS (basic input/output system). The hard disk drive interface 1030 is coupled to a hard disk drive 1090. The disk drive interface 1040 is coupled to a disk drive 1100. Detachable storage media, such as magnetic disks and optical discs, are inserted into the disk drive 1100. The serial port interface 1050 is coupled to a mouse 1110 and a keyboard 1120, for example. The video adapter 1060 is coupled to a display 1130, for example.

The hard disk drive 1090 stores therein an OS 1091, an application program 1092, a program module 1093, and program data 1094, for example. In other words, the program defining the processing performed by the log analysis device 40 is provided as the program module 1093 describing computer-executable codes. The program module 1093 is stored in the hard disk drive 1090, for example. The program module 1093 that executes the same processing as that performed by the functional configuration in the log analysis device 40, for example, is stored in the hard disk drive 1090. Instead of the hard disk drive 1090, an SSD may be provided.

The setting data used for the processing according to the present embodiment is stored in the memory 1010 or the hard disk drive 1090 as the program data 1094, for example. The CPU 1020 reads and executes the program module 1093 and the program data 1094 stored in the memory 1010 or the hard disk drive 1090 in the RAM 1012 as needed.

The program module 1093 and the program data 1094 are not necessarily stored in the hard disk drive 1090. The program module 1093 and the program data 1094 may be stored in a detachable storage medium and read by the CPU 1020 via the disk drive 1100, for example. Alternatively, the program module 1093 and the program data 1094 may be stored in a second computer coupled via a network (e.g., a LAN or a WAN (wide area network)). In this case, the program module 1093 and the program data 1094 may be read from the second computer by the CPU 1020 via the network interface 1070.

REFERENCE SIGNS LIST

1 log analysis system
10 malware-sharing server
20 malware dynamic analysis device
30 log collection and accumulation device
40 log analysis device
50 operator
101 malware sample information
201 malware acquirer
202 dynamic analyzer
203 malicious communication log
301 collector
302 normalizer
303 normalized communication log
401 log acquirer
402 signature generator
403 malware analysis report acquirer
404 malware information adder
405 trainer
406 log analyzer
407 detection result display unit
408 harmlessness determiner
451 analysis communication log
452 malicious communication log
453 signature information
454 detection result
455 harmlessness determination condition

The invention claimed is:

1. A non-transitory log analysis device comprising:
a memory; and
a processor coupled to the memory and programmed to execute a process comprising:
acquiring a first communication log obtained from communications in a predetermined network and a second communication log obtained from communications performed by malware;
extracting a field satisfying a predetermined condition from a plurality of the fields included in the second communication log;
generating a signature serving as a condition for detecting a terminal infected with the malware based on a field and a value included in the second communication log and in which a threshold value is set for the signature corresponding to occurrences of recording of a pair of the extracted field and the value in a communication to be analyzed;
acquiring information on the malware from a malware-sharing server, wherein the information is acquired as a report file including at least one of information on a file accessed by the malware, a command executed by the malware, behavior of the malware, and a detection result of anti-virus software on the malware;

adding the information on the malware to the signature;

analyzing the first communication log using the signature;

detecting the terminal infected with the malware based on the pair of the extracted field and the value being recorded in the first communication log at least the threshold number of times; and displaying, in response to the detecting, a detection result obtained from the first communication log and the information on the malware added to the signature used in the analysis of the first communication log in a manner associated with each other.

2. The log analysis device according to claim 1, wherein the displaying further displays information on the first communication log having a field and a value agreeing with the field and the value of the signature out of a plurality of the first communication logs.

3. The log analysis device according to claim 1, further comprising:

receiving selection indicating whether the detection result is harmless; and generating a condition based on the selection; and determining whether the detection result is harmless based on whether the detection result satisfies the condition generated, wherein the displaying displays, when the determining determines that the detection result is not harmless, the detection result and the information on the malware in a manner associated with each other.

4. The log analysis device according to claim 1, further comprising initially generating a plurality of signatures, and excluding a signature among the plurality of signatures from being the generated signature based on having a number or a ratio of erroneous detections in the analysis of the first communication log equal to or larger than a predetermined value.

5. The log analysis device according to claim 1, wherein the adding adds at least one of a file type, date and time of registration, a detection name, and operation information to the signature as the information on the malware.

6. The log analysis device according to claim 1, wherein the threshold value is greater than 1.

7. A log analysis method performed by a log analysis device, the log analysis method comprising:

acquiring a first communication log obtained from communications in a predetermined network and a second communication log obtained from communications performed by malware;

extracting a field satisfying a predetermined condition from a plurality of the fields included in the second communication log;

generating a signature serving as a condition for detecting a terminal infected with the malware based on a field and a value included in the second communication log and in which a threshold value is set for the signature corresponding to occurrences of recording of a pair of the extracted field and the value in a communication to be analyzed;

acquiring information on the malware from a malware-sharing server, wherein the information is acquired as a report file including at least one of information on a file accessed by the malware, a command executed by the malware, behavior of the malware, and a detection result of anti-virus software on the malware;

adding the information on the malware to the signature;

analyzing the first communication log using the signature;

detecting the terminal infected with the malware based on the pair of the extracted field and the value being recorded in the first communication log at least the threshold number of times; and displaying, in response to the detecting, a detection result obtained from the first communication log and the information on the malware added to the signature used in the analysis of the first communication log in a manner associated with each other.

8. A non-transitory computer-readable recording medium having stored a program for analysis that causes a computer to execute a process comprising:

acquiring a first communication log obtained from communications in a predetermined network and a second communication log obtained from communications performed by malware;

extracting a field satisfying a predetermined condition from a plurality of the fields included in the second communication log;

generating a signature serving as a condition for detecting a terminal infected with the malware based on a field and a value included in the second communication log and in which a threshold value is set for the signature corresponding to occurrences of recording of a pair of the extracted field and the value in a communication to be analyzed;

acquiring information on the malware from a malware-sharing server, wherein the information is acquired as a report file including at least one of information on a file accessed by the malware, a command executed by the malware, behavior of the malware, and a detection result of anti-virus software on the malware;

adding the information on the malware to the signature;

analyzing the first communication log using the signature;

detecting the terminal infected with the malware based on the pair of the extracted field and the value being recorded in the first communication log at least the threshold number of times; and displaying, in response to the detecting, a detection result obtained from the first communication log and the information on the malware added to the signature used in the analysis of the first communication log in a manner associated with each other.

* * * * *